(12) United States Patent
Liao (10) Patent No.: US 7,708,445 B2
(45) Date of Patent: May 4, 2010

(54) LIGHT GUIDE DEVICE AND BACKLIGHT MODULE USING THE SAME

(75) Inventor: Ming-Yi Liao, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 155 days.

(21) Appl. No.: 11/502,184

(22) Filed: Aug. 10, 2006

(65) Prior Publication Data
US 2007/0064440 A1 Mar. 22, 2007

(30) Foreign Application Priority Data
Sep. 21, 2005 (CN) .......................... 2005 1 0037465

(51) Int. Cl.
*F21V 8/00* (2006.01)
(52) U.S. Cl. ........................ 362/615; 362/608; 362/617
(58) Field of Classification Search ......... 362/606–608, 362/615–629
See application file for complete search history.

(56) References Cited

U.S. PATENT DOCUMENTS

| | | | | |
|---|---|---|---|---|
| 4,918,577 A | * | 4/1990 | Furudate | 362/615 |
| 5,613,751 A | * | 3/1997 | Parker et al. | 362/627 |
| 5,949,505 A | * | 9/1999 | Funamoto et al. | 349/65 |
| 5,997,148 A | * | 12/1999 | Ohkawa | 362/619 |
| 6,976,779 B2 | * | 12/2005 | Ohtsuki et al. | 362/608 |
| 7,039,286 B2 | * | 5/2006 | Leu et al. | 385/129 |
| 7,101,070 B2 | * | 9/2006 | Yu et al. | 362/558 |
| 7,182,499 B2 | * | 2/2007 | Chen et al. | 362/621 |
| 7,188,987 B2 | * | 3/2007 | Yu | 362/608 |
| 7,370,999 B2 | * | 5/2008 | Feng et al. | 362/619 |
| 2006/0291240 A1 | * | 12/2006 | Kim et al. | 362/600 |
| 2006/0291248 A1 | * | 12/2006 | Yu | 362/615 |

FOREIGN PATENT DOCUMENTS

| | | |
|---|---|---|
| CN | 2604706 Y | 2/2004 |
| CN | 1542465 A | 11/2004 |
| KR | 10-2005/0065285 | * 7/2005 |

* cited by examiner

*Primary Examiner*—Sharon E Payne
(74) *Attorney, Agent, or Firm*—Clifford O. Chi (57) ABSTRACT

A light guide device (21) includes an incident surface (211), an emitting surface (212) and a plurality of protrusions (212a). The incident surface is configured so as to allow an incident light to pass therethrough. The emitting surface is adjoining the incident surface and configured so as to allow the light to emit out of the light guide device. The protrusions are formed on at least a portion of the emitting surface. The protrusions are configured for concentrating light that emits out from said portion of the emitting surface. The present application is also concerned to a backlight module (2) including a light source (22) and the light guide device.

18 Claims, 8 Drawing Sheets

LIGHT GUIDE DEVICE AND BACKLIGHT MODULE USING THE SAME

FIELD OF THE INVENTION

The present invention relates to light guide devices and backlight modules and, particularly, to a light guide device and backlight module for use in, e.g., a liquid crystal display (LCD).

BACKGROUND

In a liquid crystal display (LCD) device, a liquid crystal is a substance that does not itself illuminate light. Instead, the liquid crystal relies on receiving light from a light source, thereby displaying images and data. In the case of a typical liquid crystal display device, a backlight module powered by electricity supplies the needed light. Generally, a bottom-lighting type backlight module and/or an edge-lighting type backlight module are/is provided.

Generally, a bottom-lighting type backlight module has two or more light sources, thus making the overall LCD big, heavy, and energy inefficient. Therefore, bottom-lighting type backlight modules are usually employed in LCDs or LCD televisions where portability, mass, and volume are negligible factors.

Figure 1:
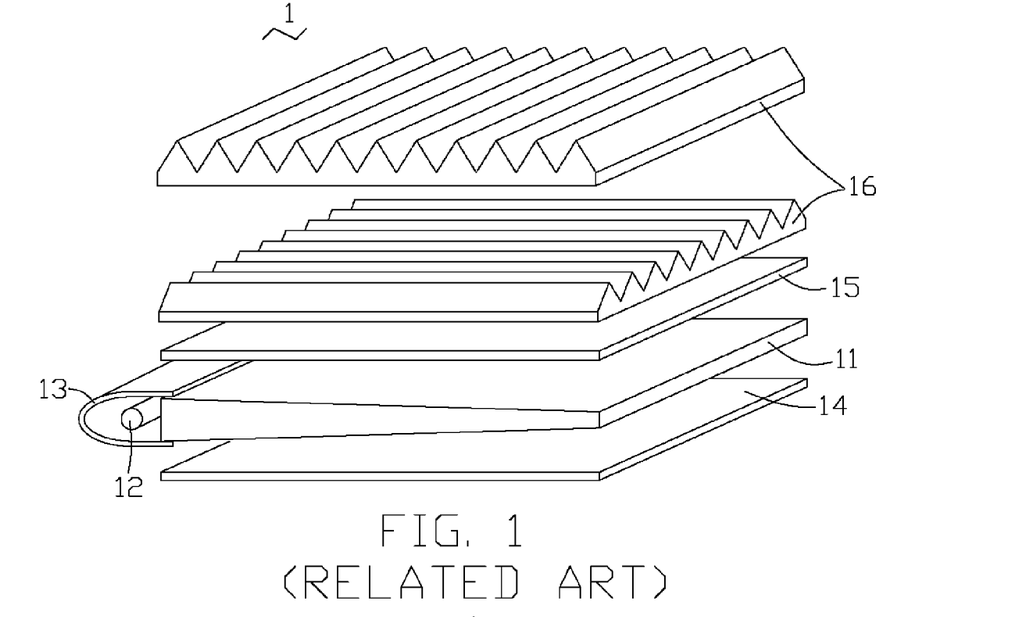
FIG. 1 is a schematic, perspective view of a conventional backlight module.

FIG. 1 represents a typical edge-lighting type backlight module 1. The backlight module 1 includes a light guide plate 11, a light source 12, a reflector 13, and a plurality of optical elements 14, 15, and 16. The light guide device 11 is wedge-shaped. The optical elements include a reflective sheet 14, a diffusion sheet 15, and two prism sheets 16. The light source 12 generally includes a cold cathode fluorescent lamp (CCFL). The reflective sheet 14 is positioned under the light guide plate 11 and is configured for reflecting light back into the light guide plate 11. The diffusion sheet 15 is located above the light guide plate 11 and is configured for uniformly diffusing the emitted light. The prism sheets 16 are positioned above the diffusion sheet 15 and are configured for collimating the emitted light, thereby improving the brightness of light illumination.

Figure 2:
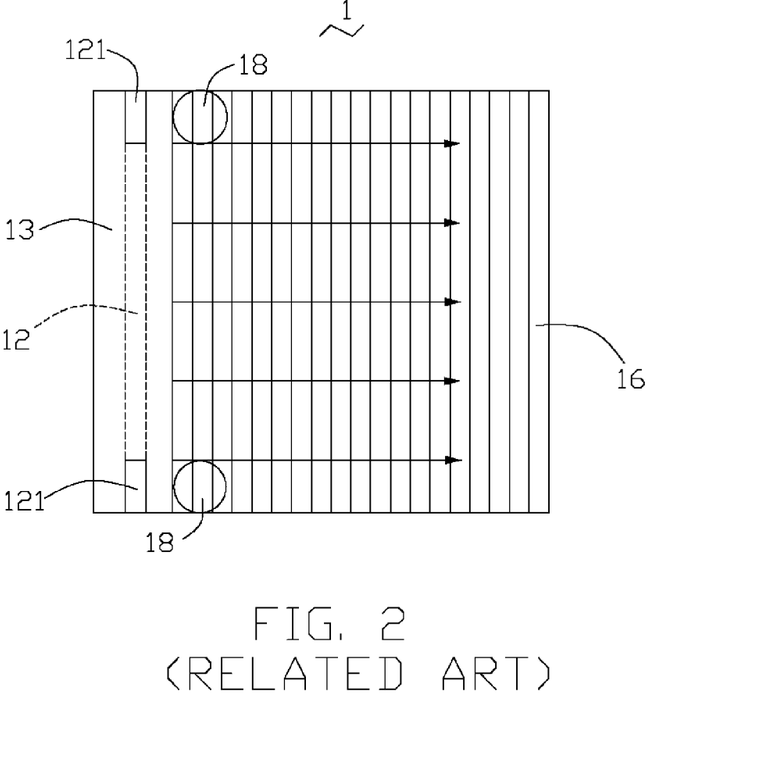
FIG. 2 is a top view of the conventional backlight module of FIG. 1.

Also referring to FIG. 2, two ends of the light source 12, i.e. two electrodes 121 that do not emit light results in that few light enters into two corners of the light guide plate 11 adjacent to the two electrodes 121. Thus, two dark corners 18 are formed. The light source 12 may be configured to extend or displace farther out from the light guide plate 11 to solve the above problem. However, it makes little effect and instead will enlarge the volume of the backlight module 1.

What is needed, therefore, is a light guide device and a backlight module using the same which overcome the above-described problem.

SUMMARY

A light guide device according to an embodiment includes an incident surface, an emitting surface and a plurality of protrusions. The incident surface is configured so as to allow an incident light to pass therethrough. The emitting surface is adjoining the incident surface and configured so as to allow the light to emit out of the light guide device. The protrusions are formed on at least a portion of the emitting surface. The protrusions are configured for concentrating light that emits out from said portion of the emitting surface.

A backlight module according to a preferred embodiment includes a light source and an above-described light guide device.

Other advantages and novel features will become more apparent from the following detailed description of preferred embodiments when taken in conjunction with the accompanying drawings.

BRIEF DESCRIPTION OF THE DRAWINGS

Many aspects of the light guide device and related backlight module having the same can be better understood with reference to the following drawings. The components in the drawings are not necessarily to scale, the emphasis instead being placed upon clearly illustrating the principles of the present device. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present light guide device and backlight module, in detail.

Figure 3:
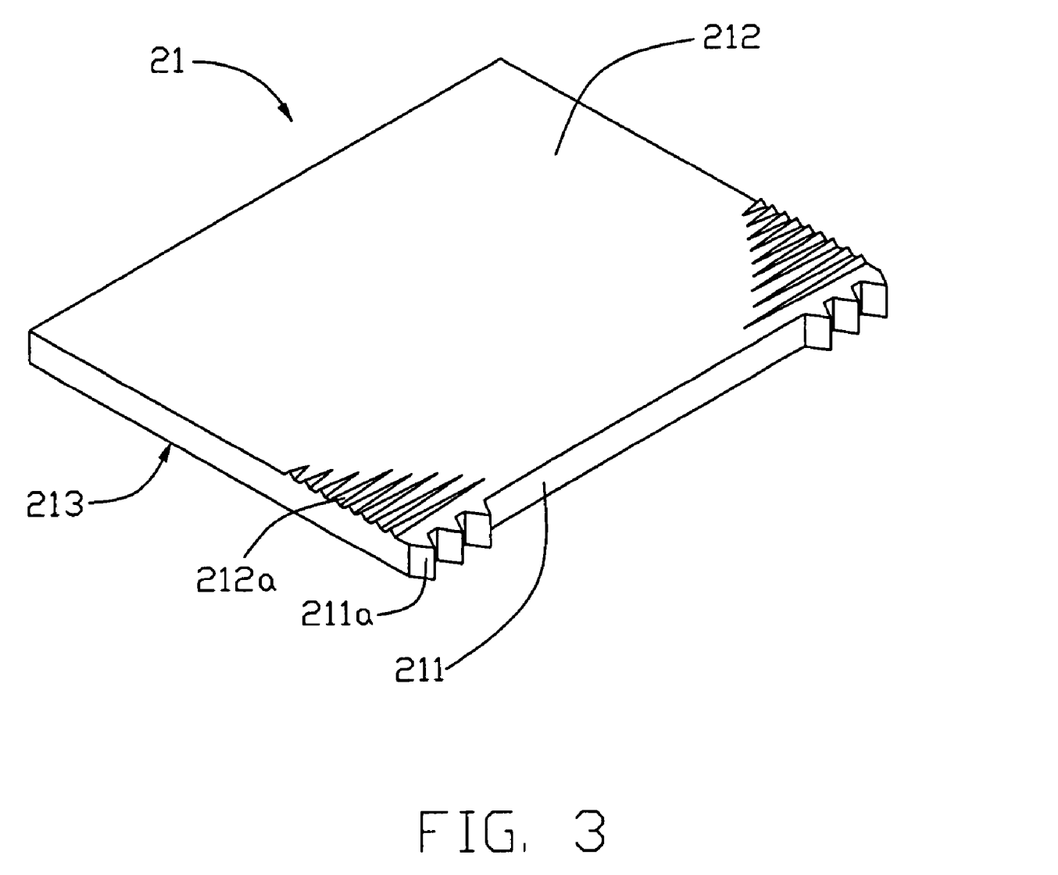
FIG. 3 is a schematic, perspective view of a light guide device according to a first preferred embodiment.

Referring to FIG. 3, a light guide device 21, in accordance with a first preferred embodiment is shown. The light guide device 21 is a rectangular sheet, or alternatively may be generally cuneiform. The light guide device 21 includes an incident surface 211 formed on one side surface thereof, an emitting surface 212 adjacent to the incident surface 211, and a bottom surface 213 opposite to the emitting surface 212. A plurality of first protrusions 211a is formed on two ends of the incident surface 211. A plurality of second protrusions 212a is formed on two corners of the emitting surface 212 corresponding to the adjacent incident surface 211. The bottom surface 213 is configured to reflect light by defining a plurality of microstructures (not shown) thereof such as protrusions, recesses or dots. It is to be understood that the microstructures may also be omitted.

Figure 4:
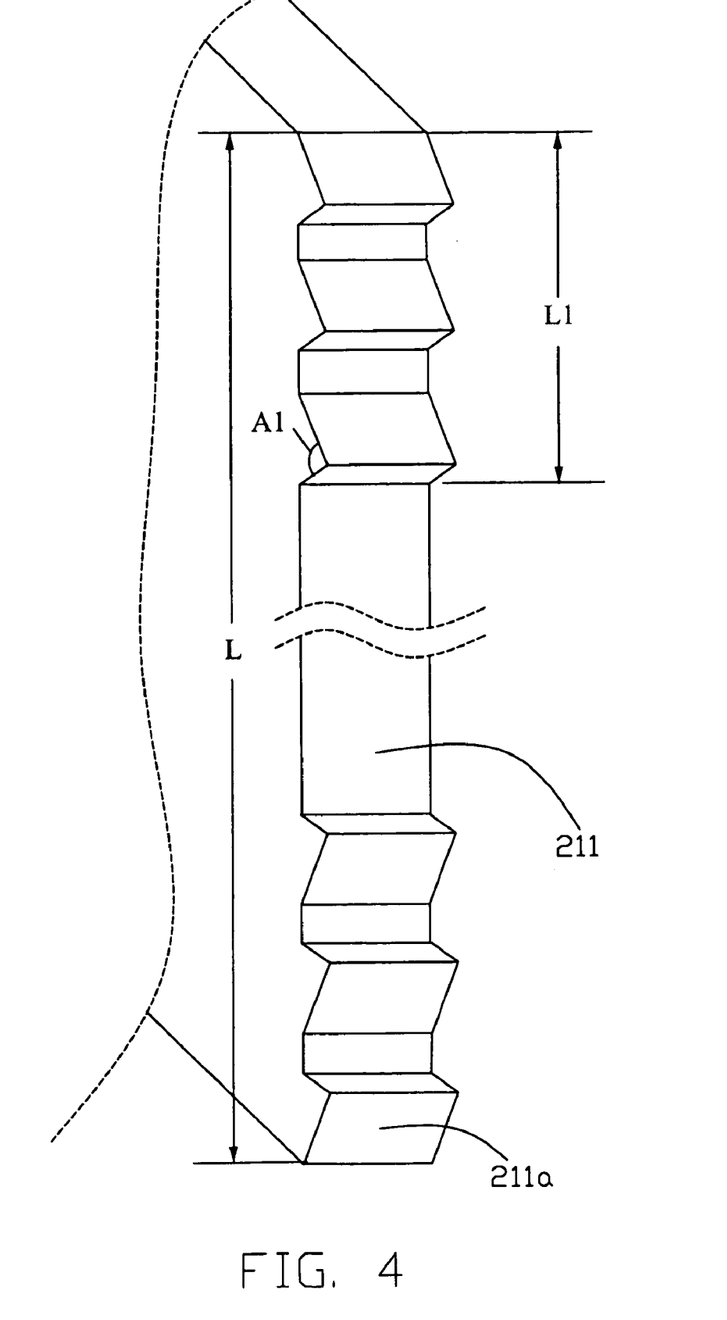
FIG. 4 is an enlarged view of an incident surface of the light guide device of FIG. 3.

Referring to FIG. 4, a length of the incident surface 211 is represented by "L". The first protrusions 211a are formed on each end of the incident surface 211 along a length of "L1". The length of "L1" is configured to be less than a quarter of "L". Each first protrusion 211a is in a shape of triangular prism. Each first protrusion 211a has a triangular cross-section taken along a direction perpendicular to the incident surface 211 and parallel to the emitting surface 212. Each triangular cross-section of the first protrusions 211a defines a vertex angle A1. The vertex angle A1 progressively increase with increasing distance from the two ends of the incident surface 211 toward a middle of the incident surface 211. The vertex angle A1 is configured to be larger than or equal to 60 degrees and less than or equal to 150 degrees.

Figure 6:
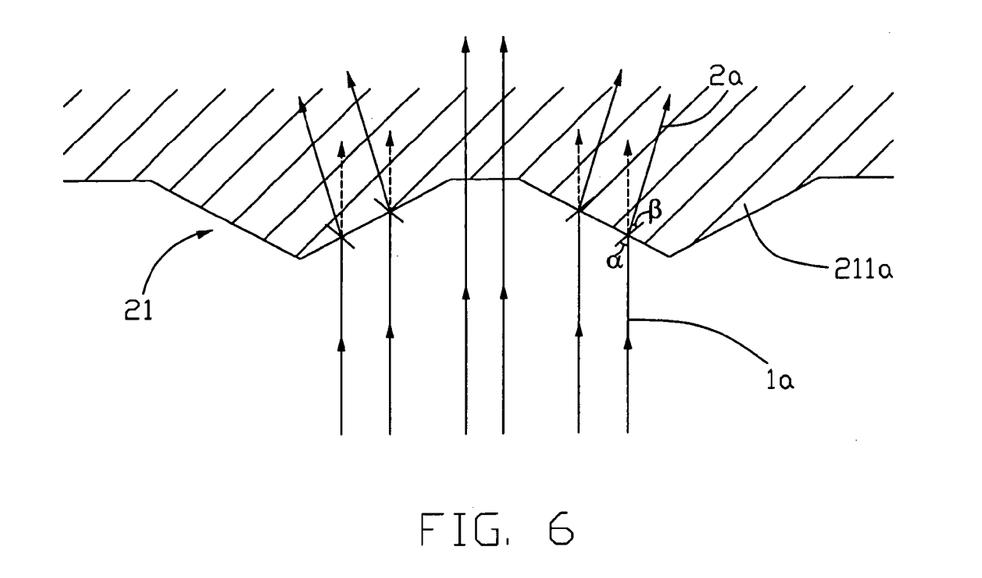
FIG. 6 is a partially schematic view of a light path when light beams pass the first protrusion of the light guide device of FIG. 3.

Referring to FIG. 6, an incident light 1a enters the light guide device 21 through an outside substance (i.e., atmosphere). An incident angle of the incident light 1a is defined as "α", and an angle of refraction of a refractive light 2a is defined as "β". "n1" represents a refractive index of the atmosphere and "n2" represents a refractive index of the light guide device 21. Furthermore, "n1" is less than the "n2". A formula of refraction law is defined as: $n1*\sin \alpha = n2*\sin \beta$. Therefore α is larger than β. Thus, any incident light parallel to the incident light 1a is diffused.

Figure 5:
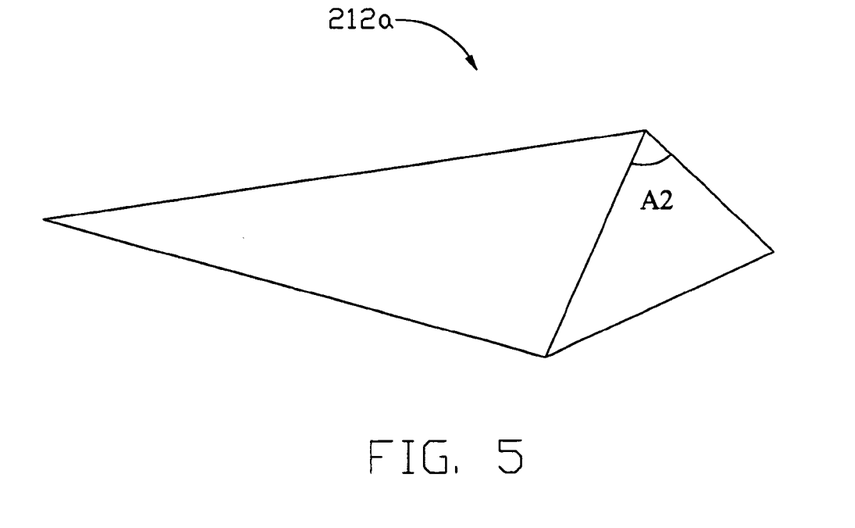
FIG. 5 is an enlarged view of a second protrusion of the light guide device of FIG. 3.

Referring to FIG. 5, the second protrusions 212a are in a shape of an elongated tetrahedron. Each second protrusion 212a has a base surface parallel to the emitting surface 212 and a side surface perpendicularly adjacent to the emitting surface 212. Each side surface of the second protrusions 212a defines a vertex angle A2 where "A2" is larger than or equal to 45 degrees and less than or equal to 175 degrees.

Figure 7:
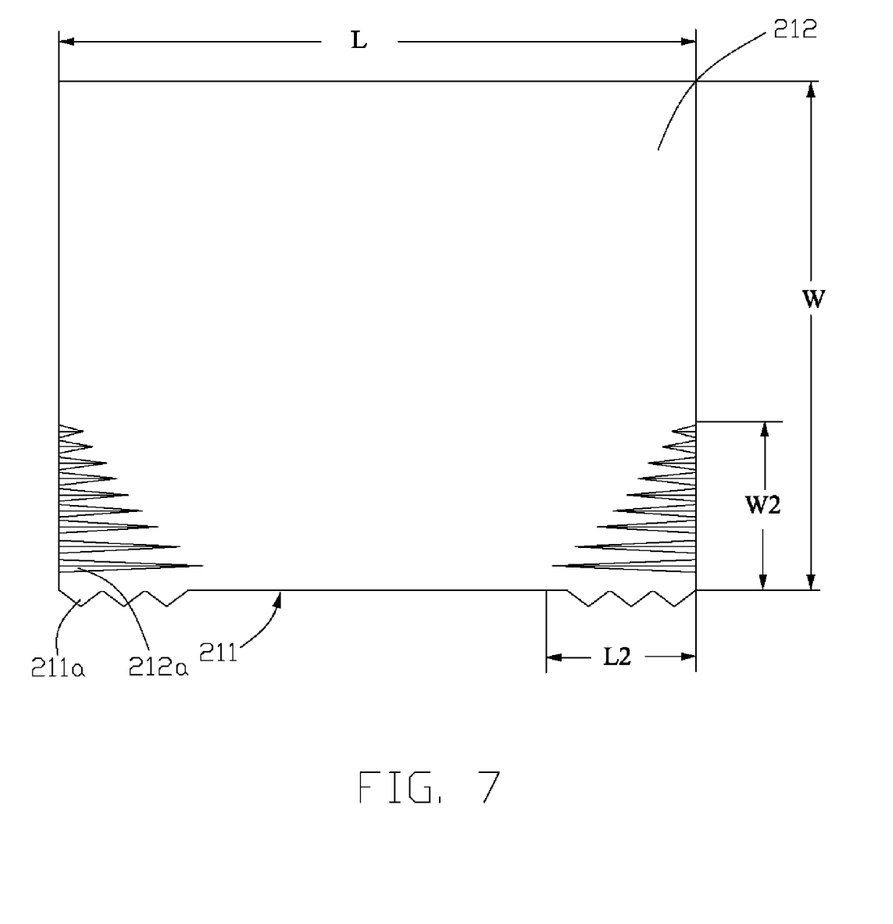
FIG. 7 is a top view of an emitting surface of the light guide device of FIG. 3.

Referring also to FIG. 7, the emitting surface 212 has a length of "L" and a width of "W". The second protrusions 212a extend out of the emitting surface 212 at regular intervals along the width of the emitting surface 212. A length of the longest second protrusion 212a "L2" is less than a quarter of "L". The second protrusions 212a is disposed within an area with width "W2" that is less than one third of "W". Lengths of the second protrusions 212a progressively decrease with increasing distance between the incident surface 211 and the second protrusion 212a.

When the light guide device 21 is in use, light passes through the light incident surface 211 and enters the light guide device 21. Light is reflected and refracted inside the light guide device 21 before finally outputted from the light guide device 21 via the emitting surface 212.

The first protrusions 211a refract part of the incident light toward the corners of the light guide device 21 so that more light enters the corners. Light is diffused evenly throughout the light guide device 21 by the first protrusions 211a. Thus, the first protrusions 211a makes more light rays incident the light guide device 21 via two ends of the incident surface 211. Contrary, when the light is emitted out of the emitting surface 212 via the corners thereof, the second protrusions 212a serve to concentrate light so as to increase the emitting light in the corners of the emitting surface 212 adjacent to the two ends of the incident surface 211. Thereby, a luminance of the corners of the emitting surface 212 is higher. In conclusion, the light guide device 21 has good emitting luminance and uniformity.

In alternative embodiment, the first protrusion 211a may also be a shape of hexahedron having a quadrangular cross-section such as trapezoidal cross-section. A certain optional non-protruding flat interval may also be arranged between every two first protrusions 211a. The second protrusion 212a may also be polyhedron having a polygonal cross-section. The first and second protrusions 211a, 212a are either manufactured together with the light guide device 21 or formed by a method of V-cutting.

Figure 8:
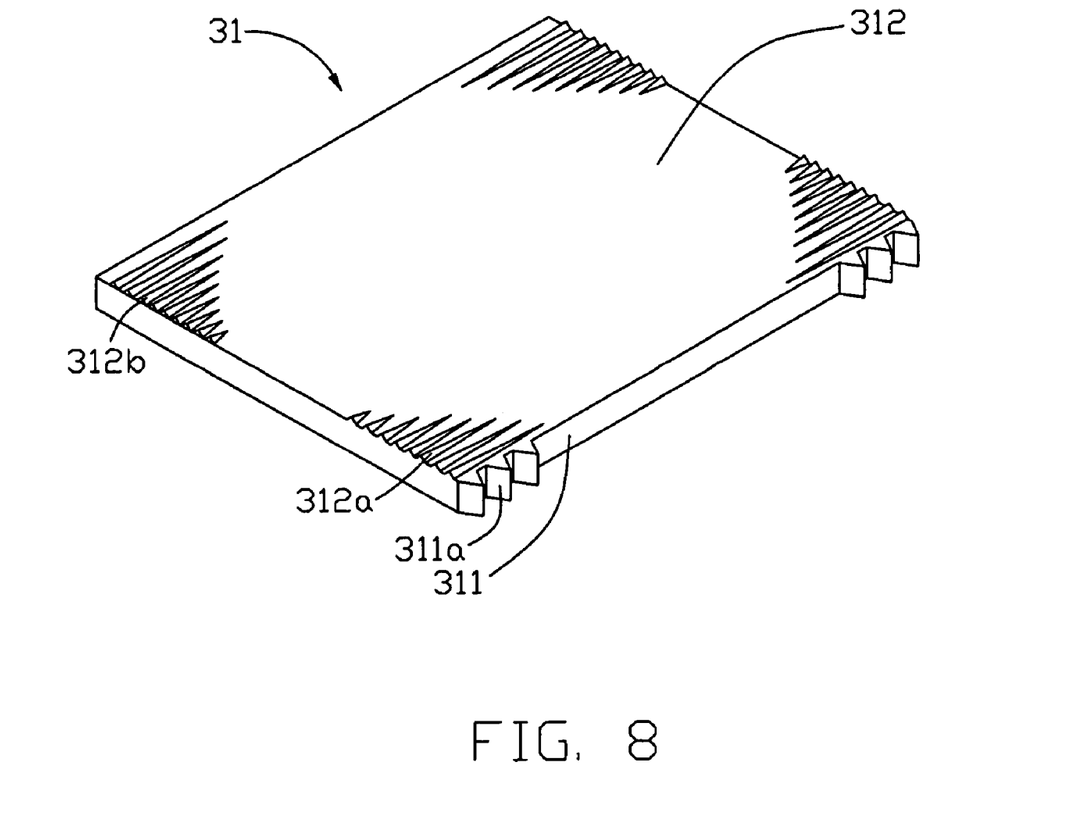
FIG. 8 is a schematic, perspective view of a light guide device according to a second preferred embodiment.

FIG. 8 shows a second embodiment light guide device 31. The light guide device 31 in accordance with the second preferred embodiment of the present application is the same as the first embodiment, except that a number of third protrusions 312b are formed on the emitting surface 312. The light guide device 31 has a same number of first and second protrusions 311a and 312a as the first and second protrusions 211a and 212a of the light guide device 21 of the first embodiment. The third protrusions 312b are arranged symmetrical to the second protrusions 312a. A shape of the third protrusion 312b is the same as the second protrusion 312a.

Figure 9:
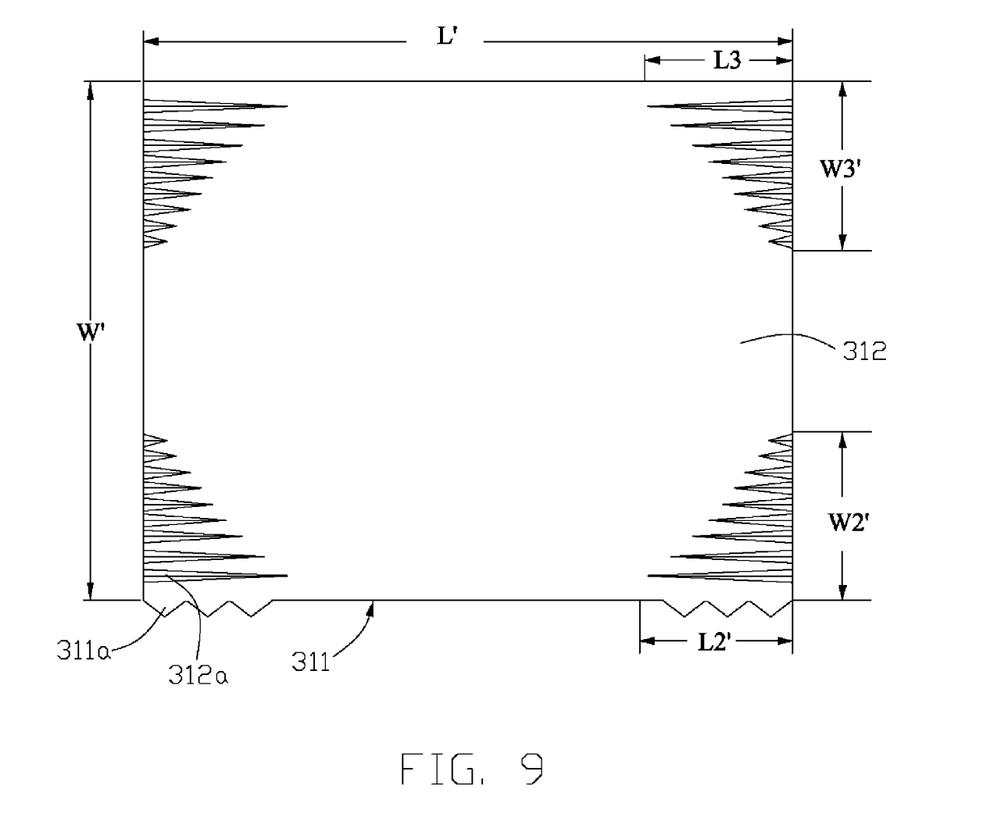
FIG. 9 is a top view of an emitting surface of the light guide device of FIG. 8.

Referring also to FIG. 9, the emitting surface 312 has a length of "L'" and a width of "W'". The second protrusions 312a and the third protrusions 312b extend out of the emitting surface 312 at regular intervals along the width of the emitting surface 312 and parallel to each other. A length of the longest second protrusion 312a "L2'" and a length of the longest third protrusion 312b "L3" are both less than a quarter of "L'". The second protrusions 312a is disposed within an area with width "W2'" and the third protrusions 312b is disposed within an area with width "W3" that are both less than one third of "W'".

Similar to the second protrusions 212a in the first embodiment, the third protrusions 312b results in that light emitting from the other two corners of the emitting surface 312 adjacent to two ends of the incident surface 311 increases.

In other exemplary embodiments, the third protrusion 312b may also be polyhedrons having a polygonal cross-section. The third protrusions 312b are either manufactured together with the light guide device 31 or formed by a method of V-cutting.

Figure 10:
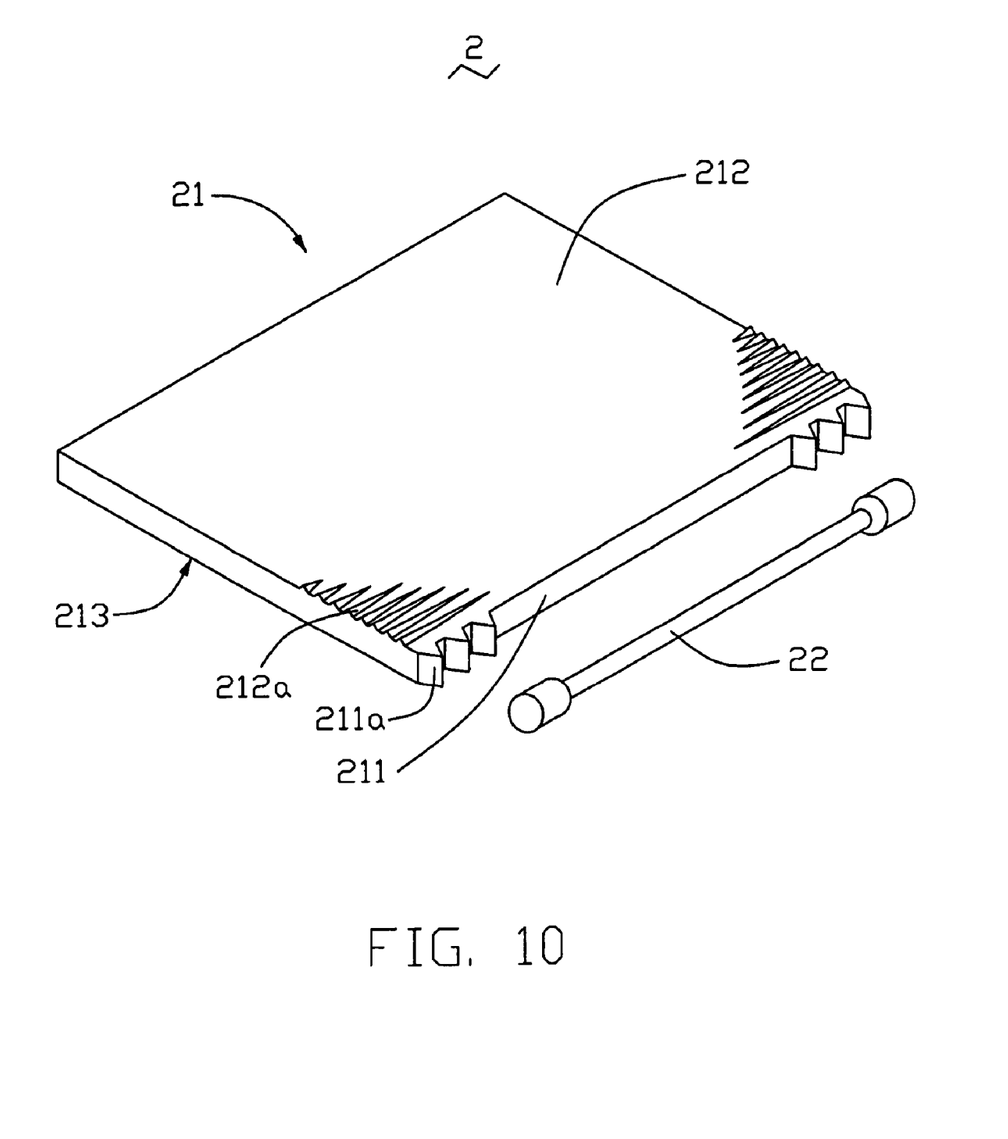
FIG. 10 is a schematic, perspective view of a backlight module according to a third preferred embodiment.

Referring to FIG. 10, a backlight module 2 of a third preferred embodiment is similar to that of the first embodiment, except that a light source 22 is provided, i.e. the backlight module 2 includes the light guide device 21 and the light source 22. Facing and being opposite to the incident surface 211 of the light guide device 21, the light source 22 is mounted besides the light guide device 21. The light source 22 generally is a CCFL. The light guide device 21 employed in the backlight module 2 is alternative with the light guide device 31.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A light guide device, comprising:
   an incident surface having two opposite ends;
   an emitting surface adjoining the incident surface and having two corners adjacent the ends of the incident surface;
   a plurality of first protrusions exclusively formed on the ends of the incident surface to refract part of the incident light toward the ends of the emitting surface; and
   a plurality of second protrusions exclusively formed on the corners of the emitting surface to concentrate light that emits out from the corners of the emitting surface.

2. The light guide device according to claim 1, wherein the light guide device is one of a rectangular sheet and a cuneiform sheet.

3. The light guide device according to claim 1, wherein the first protrusions are in a shape of prism, each first protrusion has a triangular cross-section taken along a plane perpendicular to the incident surface and parallel the emitting surface.

4. The light guide device according to claim 3, wherein each triangular cross-section of the first protrusions defines a vertex angle larger than or equal to 60 degrees and less than or equal to 150 degrees, the vertex angles progressively increase with increasing distance from the two ends of the incident surface toward a middle of the incident surface.

5. The light guide device according to claim 1, wherein the first protrusions are disposed in an area with a length less than a quarter of a length of the incident surface at one end of the incident surface.

6. The light guide device according to claim 1, wherein the second protrusions are in a shape of an elongated tetrahedron.

7. The light guide device according to claim 6, wherein each second protrusion has a base surface parallel to the emitting surface and a side surface perpendicularly adjacent to the emitting surface, a length of the second protrusion progressively decreases with increasing distance from the incident surface.

8. The light guide device according to claim 7, wherein each side surface of the second protrusions defines a vertex angle larger than or equal to 45 degrees and less than or equal to 175 degrees.

9. The light guide device according to claim 8, wherein a length of the longest second protrusion is less than a quarter of the length of the incident surface, and the second protrusions is disposed in an area with a width less than one third of the width of the emitting surface.

10. The light guide device according to claim 1, wherein the emitting sLirface further forms a plurality of third protrusions that are symmetrical to the second protrusions.

11. The light guide device according to claim 10, wherein the third protrusions are in a shape of elongated tetrahedron.

12. The light guide device according to claim 11, wherein each third protrusion has a base surface parallel to the emitting surface and a side surface perpendicular and adjacent to the emitting surface, and each side surface of the third protrusions defines a vertex angle larger than or equal to 45 degrees and less than or equal to 175 degrees.

13. The light guide device according to claim 12, wherein a length of the longest third protrusion is less than a quarter of the length of the incident surface, and the third protrusions is disposed an area with width less than one third of the line of the emitting surface perpendicular to the incident surface.

14. A backlight module comprising:
a light source; and
a light guide device comprising:
an incident surface positioned to receive light from the light source, the incident surface having two opposite ends;
an emitting surface adjoining the incident surface and having two corners adjacent the ends of the incident surface;
a plurality of first protrusions exclusively formed on the ends of the incident surface to refract pail of the incident light toward the ends of the emitting surface; and
a plurality of second protrusions exclusively formed on the corners of the emitting surface adjacent to the incident surface to concentrate light that emits out from the corners of the emitting surface.

15. The backlight module according to claim 14, wherein the light guide device further comprises a bottom surface opposite to the emitting surface for reflecting lights.

16. The backlight module according to claim 14, the first protrusions are in a shape of prism, each first protrusions has a triangular cross-section taken along a plane perpendicular and parallel to the incident surface, each triangular cross-section of the first protrusions defines a vertex angle progressively increase with increasing distance from the two ends of the incident surface toward a middle of the incident surface.

17. The backlight module according to claim 14, wherein each second protrusion has a base surface parallel to the emitting surface and a side surface perpendicularly adjacent to the emitting surface, a length of the second protrusions progressively decreases with increasing distance from the incident surface.

18. The backlight module according to claim 14, wherein the light guide device further comprises a plurality of third protrusions on two other corners thereof, each third protrusion has a base surface parallel to the emitting surface and a side surface perpendicular and adjacent to the emitting surface, a length of the third protrusions progressively decreases with decreasing distance from the incident surface.

* * * * *